Figure 1:
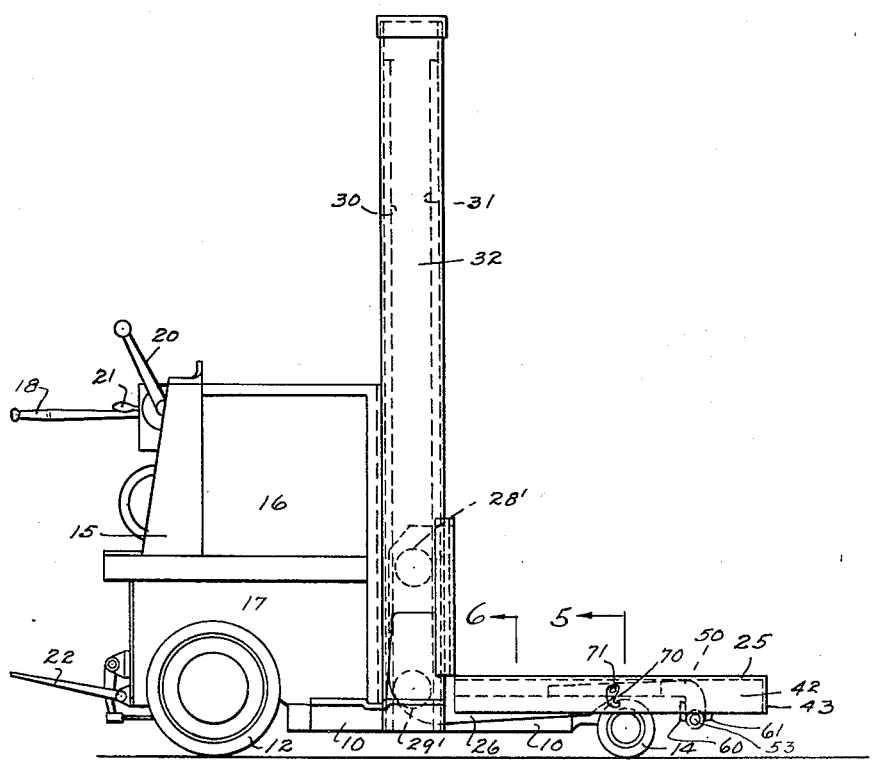

Sept. 27, 1932.  E. J. ABBE  1,878,995
INDUSTRIAL TRUCK
Filed June 19, 1931   2 Sheets-Sheet 1

Inventor
Edward J. Abbe
By Bates, Golick & Fease
Attorneys

Sept. 27, 1932. E. J. ABBE 1,878,995
INDUSTRIAL TRUCK
Filed June 19, 1931 2 Sheets-Sheet 2
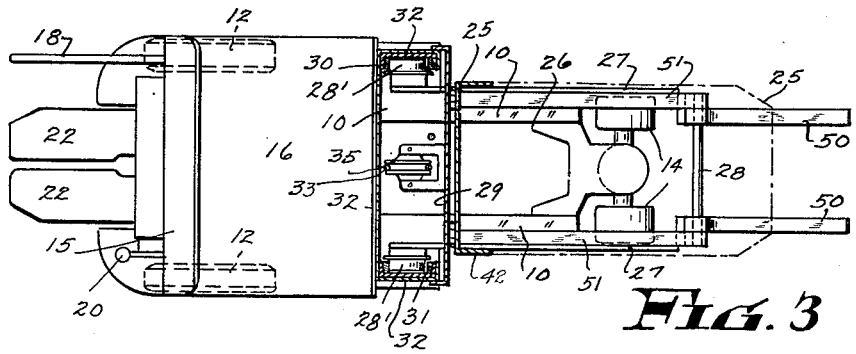
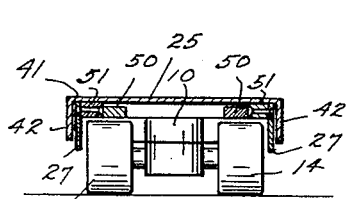
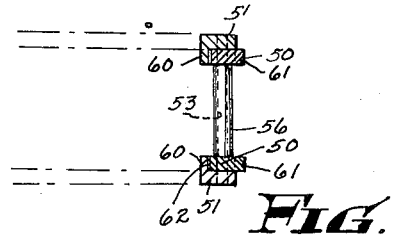
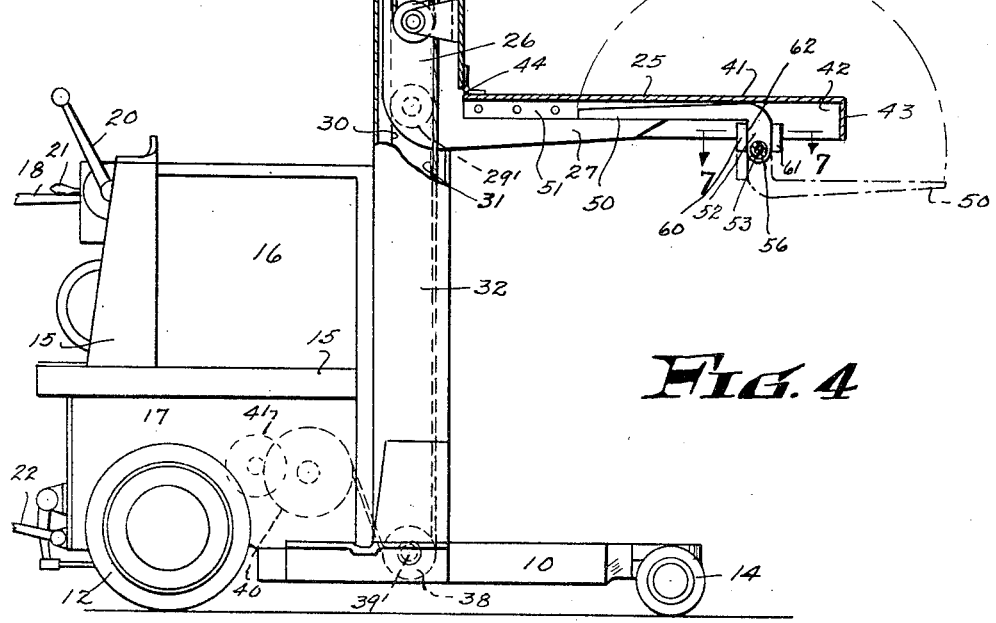
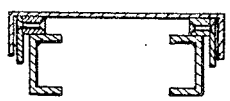
Inventor
Edward J. Abbe.
By Bates, Golrick & Teare
Attorneys Patented Sept. 27, 1932

1,878,995

UNITED STATES PATENT OFFICE

EDWARD J. ABBE, OF CLEVELAND, OHIO, ASSIGNOR TO THE ELWELL PARKER ELECTRIC COMPANY, OF CLEVELAND, OHIO, A CORPORATION OF OHIO

INDUSTRIAL TRUCK

Application filed June 19, 1931. Serial No. 545,439.

This invention relates to an industrial truck of the tier-lift type, and especially to a truck having a load-engaging platform adapted to support a load while it is being conveyed from place to place.

In many industrial establishments it has been found advantageous to use a comparatively small power-driven truck, having a forwardly extending platform, which is so arranged as to be moved to a position beneath the load and thereafter raised. This supports the load on the surface of the platform and transports it from place to place as desired. Trucks of this nature generally comprise a main frame, supported by a pair of driving wheels at one end and a pair of relatively small load-engaging wheels at the forward end. A source of power, which usually comprises a battery and suitable motor and placing units, is carried adjacent the rear end of the frame. Forward on the power unit is mounted an upright frame or guideway in which a carriage is mounted for vertical movement, and which carriage supports a suitable platform. The carriage and platform are so arranged as to traverse the vertical guideway. In such constructions it is customary to minimize the overall dimension of the truck. Hence, the platform usually lies above and extends beyond the load-bearing wheels. It is, of course, desirable that the top surface of the platform lie as close to the truck supporting surface as is possible. However, the size of the load bearing wheels depends upon the weight of the load and platform which must be supported thereby. Hence, the top surface of the platform lies some distance above the truck-supporting surface, as the load-bearing wheels being spaced apart from and below the platform to prevent interference therewith. While the platform of such a truck is, ordinarily, low enough to enable it to be slid beneath a load supported on suitable blocks, still in some instances it is desirable to pick up a load which lies much closer to the ground than would permit such truck platform to be slid therebeneath. Special trucks have therefore been designed for such purposes. However, it has been found that in many industrial establishments the need for such special truck is not sufficiently great to warrant the expenditures therefor. Hence, when loads are found to be too low to be engaged by the platform, they are manually moved, thereby causing considerable loss of time and labor, or necessitating the use of a special truck.

The general object of this invention, therefore, is to provide a truck of the platform type, which is so arranged as to pick up a load from a lower elevation than can be accomplished by means of the platform itself.

A further object of this invention is to provide an industrial truck of the tier-lift type, with a platform so arranged that it may be swung out of the way and a separate load engaging surface positioned adjacent the floor and forward of the load-bearing wheels to lift a load which lies too close to the floor for the platform to enter therebeneath.

Figure 2:
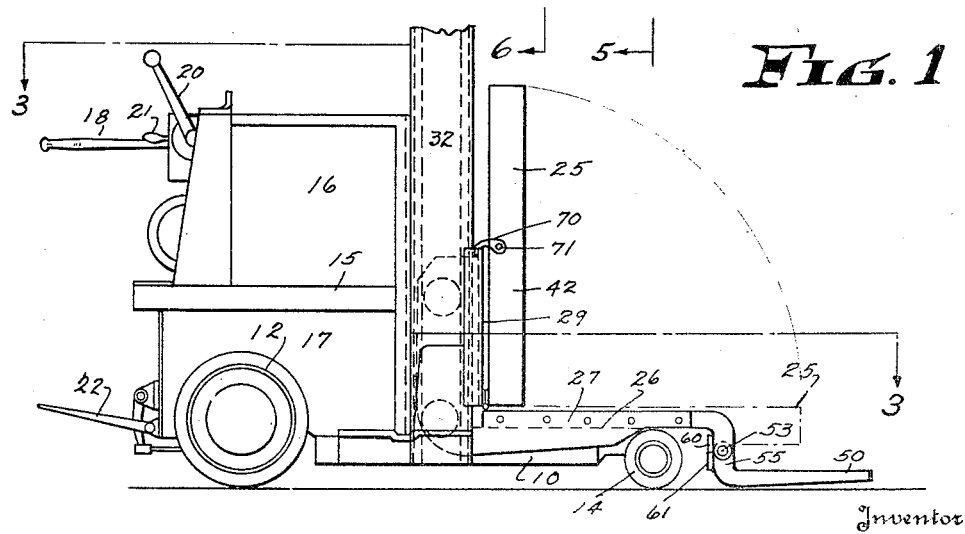

In the drawings, Fig. 1 is a side elevation of an industrial truck, having my invention embodied thereon; Fig. 2 is a fragmentary side elevation similar to Fig. 1, showing certain of the parts in a different position; Fig. 3 is a transverse horizontal section, as indicated by the offset lines 3—3 on Fig. 2; Fig. 4 is a side elevation of the truck illustrated in Fig. 1, certain parts thereof being broken away, the plane of said section being the longitudinal center line of the truck; Figs. 5 and 6 are transverse vertical sections, as indicated by the lines 5—5 and 6—6 respectively on Fig. 1; Fig. 7 is a detailed section, as indicated by the lines 7—7 on Fig. 4.

Referring again to the drawings where I have illustrated an industrial truck equipped with an improved form of my load-supporting means, there is a main chassis or frame 10, having mounted thereon, at its rearmost end, a pair of driving wheels 12, and adjacent its forward end a pair of relatively small load-carrying wheels 14. The rear end of the truck supports the truck propelling mechanism, and the various operator's controls. Extending upwardly from the rear end of the truck is a frame structure, generally indicated at 15, and comprising a support for a suitable battery or other power-supplying mechanism, and certain of the operating controls. In the embodiment illustrated, a housing 16 is mounted on the frame structure 15, and is adapted to contain a suitable battery. Beneath the housing 16 is a second housing 17, which contains a suitable motor and driving connection, including reduction gearings, differential mechanism and so forth, which propels the driving wheel 12. The various operator's controls, including the steering handle 18 and motor controllers 20 and 21, and pivoted platform members 22, (which comprise part of the control) are mounted at the extreme rear end of the frame structure 15.

The load supporting platform, generally indicated at 25, is supported by a carriage 26, so mounted that it may be raised or lowered to engage and raise a load. In the construction shown, the carriage 26 comprises a pair of frame members 27, disposed at either side of the truck, and joined together by suitable cross members, such as is indicated at 28 and 29. The carriage 26 and the members 27 carry on their outer sides a pair of rollers 28' and 29', which rollers are adapted to engage vertically extending guideways 30 and 31, respectively, formed in channel members 32, which extend upwardly intermediate the ends of the truck, and immediately forward of the frame 15.

The carriage 26 is raised and lowered in the guideway by means of a cable 33. This cable 33 is secured to the channel members 32, adjacent their uppermost ends, as at 34, and passes downwardly around a sheave 35, carried by the carriage 26, and thence upwardly around a sheave 37, mounted in the upper portion of the guideway. From the sheave 37, the cable 33 extends downwardly to a sheave 38 mounted on a shaft 39, located adjacent the lower portion of the guideway, and from there to a winding drum 40, located within the housing 17, and adapted to be operated by a suitable motor unit generally indicated at 41.

The platform 25 is carried by the carriage 26 and comprises a substantially flat plate 41 having downwardly extending side and end flanges 42 and 43. The platform 25 is pivotally mounted on the cross member 29 of the carriage by suitable hinge members 44. This platform 25 extends, as shown in Figs. 1 and 3, some distance forward of the front wheels 14 and is arranged to be normally supported in a horizontal position by the carriage frame members 27.

This arrangement is such that when the carriage and platform are in their lowermost positions, as indicated in Fig. 1, the truck may be operated to bring the platform beneath a load, which is supported on suitable blocks, spacing the lower surface of the load some distance from the floor and enabling the truck platform to be projected therebeneath. The carriage and platform are then raised by means of the winding drum, and cable 33, heretofore described, thereby raising the load from the truck supporting surface and transporting it from place to place.

It will be noted that the upper surface of the platform 25 is spaced some distance from the truck supporting surface, so that the platform and its carriage supporting members 27 may clear the load-bearing wheels 14 and prevent interference therebetween.

As heretofore mentioned, it is sometimes desirable to so construct the truck that it may pick up a load which lies considerably closer to the truck supporting surface than would permit the entrance of the platform 25 beneath such load. I therefore mount at the forward ends of the carriage frame members 27, suitable load engaging forks 50. These forks are arranged to lie comparatively close to the truck supporting surface, adjacent the forward end of the truck and forwardly of the load supporting wheels 14. Rigidly secured to the sill members 27 of the carriage 26 are a pair of bars 51, arranged to extend from the sill members 27 to a position forwardly of the load supporting wheels 14. The outermost ends of the bars 51 are bent downwardly as at 52, forming bearings for a transverse shaft 53, adapted to support the fork members 50.

The load supporting forks 50 comprise L-shaped members 50, one leg of each L arranged to lie adjacent the truck supporting surface, as indicated in Fig. 2. The other leg 55 of the L projects upwardly, and pivotally mounted on the shaft 53. As shown in the drawings, there are two such forks 50 mounted on the shaft 53, and they are spaced apart and held in contact with the carriage members 51 by a spacing bar 56, surrounding the shaft 53.

When the forks 50 are in their load-engaging position, as shown in Fig. 2, they are restrained against movement in a clockwise direction by the hinged joint, which is arranged with a stop or lock and adapted to act substantially the same as the old-fashioned carriage bow joint in automobile tops. As shown in Fig. 7 the carriage members 51 are provided with an outwardly extending ear 60, which, when the forks are in their load-engaging position as shown in Fig. 2, is adapted to abut a boss or ear 61 of the fork members, thereby preventing further rotation thereof. Normally, the fork members 50 are swung counter-clockwise to the position shown in Fig. 4, where they lie adjacent the carriage members 51 and between the under side of the platform 25 and the load engaging wheels 14. They are retained in this position by the joint mechanism, heretofore described. In this instance, however, the boss 60 of the frame member 51 contacts with the surface 62 of the leg 55 of the forks, and prevents further movement in a counter-clockwise direction.

It will be noted that when the load engaging forks are not in use, the pivot arrangement permits them to be swung out of the way to a position underlying the platform 25, thereby minimizing the overall length of the truck. When it is desired to pick up and transport a load, the height of the load from the ground being too small to permit the entrance of the platform, the platform 25 is swung about its hinge 44 and latched in a substantially vertical position, as indicated in Fig. 1, by a suitable latch 70. The latch 70 is pivoted to the side flange 42 of the platform, as at 71, and is adapted to engage the uppermost edge 73 of the transverse carriage member 29 and thereby retain the platform in its vertical position. The load engaging forks are then swung clockwise from the position shown in Figs. 1 and 4 to the position shown in Fig. 2, where they are in position to engage a load.

From the foregoing description, it is apparent that I have provided an industrial truck of the platform type, with a platform which may be swung out of the way and have provided such truck with a set of load-engaging forks adapted to project forwardly from the front foremost end of the truck to lie in a position comparatively close to the truck supporting surface to engage a load, which load is of such a height from the truck supporting surface that the platform cannot be slid thereunder, thereby providing the truck with supplemental load engaging arrangement which may be swung rearwardly when not in use to a position over the carriage frame and beneath the platform to minimize the overall length of the truck.

I claim:

1. In an industrial truck, a normally horizontally extending load engaging platform pivoted to said truck and adapted to overlie the truck frame, a second load-engaging member pivoted to the forward end of the truck extending forwardly therefrom, the upper surface of said load engaging member adapted to lie below the plane of the platform, and wherein said load engaging member may be swung about its pivot to a position underlying the platform.

2. In an industrial truck, a frame, supporting wheels adjacent the opposite ends of said frame, a substantially vertical extending guideway mounted on said frame, a carriage adapted to traverse said guideway, a load engaging platform pivotally connected to said carriage, a second load-engaging member pivoted to the forward end of said carriage and so arranged as to be swung about its pivot to a position underlying said platform.

3. In an industrial truck, a frame, wheels adapted to support opposite ends of the frame, a substantially vertically extending guideway intermediate the ends of said frame, a carriage mounted to traverse said guideway, a substantially horizontally extending load engaging platform pivotally secured at its inner end to said carriage adjacent said guideway, a second load engaging member pivotally secured to the outer end of said carriage and arranged to project forwardly therefrom, said second named load engaging member adapted to lie comparatively close to the truck supporting surface relative to the platform, and wherein said second named load engaging member is arranged to be moved about its pivot to a position underlying the platform when the latter is in its load-engaging position.

4. In an industrial truck, a frame, wheels adapted to support opposite ends of the frame, a substantially vertically extending guideway mounted intermediate the ends of said frame, a carriage mounted to traverse said guideway and extending beyond the end of said frame, a normally horizontally extending platform having one end thereof pivoted to the carriage adjacent the guideway, said platform adapted to be superimposed on the carriage and extend beyond the sides and forward end thereof, and adapted to lie over a pair of load supporting wheels, a second load engaging member pivotally secured to the forward end of the carriage and arranged to extend forward from the carriage and the truck frame, the top surface of said second named load engaging member arranged to lie in a plane below the axis of said wheels, and wherein said last named load engaging member is arranged to be moved about its pivot to a position underlying the platform when the latter is in its load-engaging position.

5. In an industrial truck, a substantially vertically extending guideway, a carriage mounted to traverse said guideway, a normally horizontally extending load engaging platform pivoted to said carriage and adapted to overlie the truck frame, said platform arranged to be pivoted to a substantially vertical position, a latch adapted to coact with the platform and the carriage to retain the platform in its vertical position, a second load-engaging member pivoted to the forward end of said carriage and arranged to extend forwardly therefrom, the upper surface of said last-named member adapted to lie below the horizontal plane of the top surface of the platform, and wherein said second named load engaging member may be swung about its pivot to a position underlying the platform when the latter is in its horizontal position.

In testimony whereof, I hereunto affix my signature.

EDWARD J. ABBE.